(12) United States Patent
Fauconnier et al.

(10) Patent No.: US 10,405,493 B2
(45) Date of Patent: Sep. 10, 2019

(54) FAN IN BEATER TO AVOID STRAWHOOD BLOCKAGES

(71) Applicant: CNH Industrial America LLC, New Holland, PA (US)

(72) Inventors: Dieter Fauconnier, Merelbeke (BE); Stefaan Ballegeer, Beernem (BE); Frank R. G. Duquesne, Zwevegem (BE); Reinout De Baere, Maldegem (BE); Stefaan Desmet, Vosselare (BE); Eli Maes, Snaaskerke (BE)

(73) Assignee: CNH Industrial America LLC, New Holland, PA (US)

(*) Notice: Subject to any disclaimer, the term of this patent is extended or adjusted under 35 U.S.C. 154(b) by 40 days.

(21) Appl. No.: 15/636,208

(22) Filed: Jun. 28, 2017

(65) Prior Publication Data

US 2017/0367269 A1    Dec. 28, 2017

(30) Foreign Application Priority Data

Jun. 28, 2016   (BE) .................................. 2016/5481

(51) Int. Cl.
*A01F 12/18*    (2006.01)
*A01F 12/40*    (2006.01)
*A01D 41/12*    (2006.01)
(Continued)

(52) U.S. Cl.
CPC ........ *A01F 12/182* (2013.01); *A01D 41/1243* (2013.01); *A01F 12/39* (2013.01);
(Continued)

(58) Field of Classification Search
CPC ...... A01F 12/44; A01F 12/444; A01F 12/442; A01F 12/182; A01F 12/40
(Continued)

(56) References Cited

U.S. PATENT DOCUMENTS 682,193 A * 9/1901 Heggem ................. A01F 12/00
                                                      460/113
713,229 A    11/1902 Livingston
(Continued)

FOREIGN PATENT DOCUMENTS

AT          106498 B     5/1927
CA          991938 A     6/1976
(Continued)

*Primary Examiner* — Alicia Torres
(74) *Attorney, Agent, or Firm* — Patrick M. Sheldrake; Peter K. Zacharias

(57) ABSTRACT

A residue handling system of an agricultural harvester includes a straw beater for receiving material other than grain from a threshing and separating system. A subsequent residue treatment device receives the material from the straw beater and breaks down larger parts of the material prior to discharge from the agricultural harvester. At least one wind generating system is located at an end of the straw beater and directs a flow of air from the vicinity of the straw beater to the subsequent residue treatment device. The flow of air is directed to pass substantially through an upper rearward part of the residue handling system. The flow of air operates to further entrain, render airborne, and transport material other than grain proceeding from the straw beater to the subsequent residue treatment device.

10 Claims, 5 Drawing Sheets

(51) Int. Cl.
    *A01F 17/02*     (2006.01)
    *A01F 29/12*     (2006.01)
    *A01F 12/39*     (2006.01)
    *A01F 12/44*     (2006.01)

(52) U.S. Cl.
    CPC .............. *A01F 12/40* (2013.01); *A01F 17/02* (2013.01); *A01F 29/12* (2013.01); *A01F 12/446* (2013.01)

(58) Field of Classification Search
    USPC ..................................... 460/73, 74, 100, 112
    See application file for complete search history.

(56) References Cited

U.S. PATENT DOCUMENTS

| | | | |
|---|---|---|---|
| 925,002 A | 6/1909 | Leonard | |
| 2,052,328 A * | 8/1936 | Welty | A01F 12/40 460/113 |
| 4,342,319 A * | 8/1982 | Willis | A01F 12/40 460/66 |
| 4,489,734 A * | 12/1984 | Van Overschelde | A01F 12/442 460/112 |
| 5,021,028 A * | 6/1991 | Kersting | A01F 12/30 460/112 |
| 5,928,080 A * | 7/1999 | Jakobi | A01F 12/40 460/112 |
| 6,866,580 B2 * | 3/2005 | Weichholdt | A01F 12/40 460/112 |
| 2004/0242291 A1 * | 12/2004 | Weichholdt | A01D 41/1243 460/112 |
| 2016/0135377 A1 | 5/2016 | Ballegeer et al. | |

FOREIGN PATENT DOCUMENTS

| | | |
|---|---|---|
| CA | 1280660 C | 2/1991 |
| EP | 0117588 A1 | 9/1984 |
| FR | 607164 A | 6/1926 |
| GB | 244102 A | 3/1926 |
| GB | 2223389 A | 4/1990 |
| WO | 2005022980 A2 | 3/2005 |

* cited by examiner

FAN IN BEATER TO AVOID STRAWHOOD BLOCKAGES

CROSS REFERENCE TO RELATED APPLICATION

This application claims priority to Belgian Application No. 2016/5481 filed Jun. 28, 2016, the contents of which are incorporated herein by reference.

FIELD OF THE INVENTION

The present invention relates to agricultural harvesters, and, more specifically to a chopper, beater, and spreader configuration.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves passes through a straw beater to remove any remaining grains, and is then transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger. The clean grain auger conveys the grain to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

The separating system directs the non-grain material and chaff, along with the courser non-grain material such as stalks and leaves coming from the straw beater, toward a residue handling system that processes and/or spreads the residue upon the field. The prior art mostly relies upon airflow generated by the primary cleaning fan to move non-grain material, residue, and chaff through the residue handling system. As a result, not uncommonly certain areas of the residue handling system may suffer from the formation of vortices within the flow of airborne material other than grain (MOG) under certain operating conditions, particularly when the combine is experiencing low throughput. This is especially true when at least part of the flow of airborne MOG passes between the straw beater and a subsequent residue treatment device such as a chopper. The formation of vortices in the flow of airborne MOG tends to result in clogging, especially when the vortices form in areas of airborne MOG containing the courser non-grain material.

Some embodiments of the prior art have provided additional fans, including adjacent to the straw beater. However, none address the problem of formation of vortices between the straw beater and a subsequent residue treatment device within the residue handling system. Canadian Patent No. 991,938 discloses the use of auxiliary blowers, but they adjoin the primary cleaning fan, not the straw beater. Canadian Patent No. 1,280,660 discloses the use of a pair of fans located adjacent to the straw beater, but they are used to draw a strong current of air along the outer surface of the threshing cage, in order to minimize the effects of turbulent air being expelled from the threshing cage. The '660 patent states that, "It is noted that the end of the discharge beater, which is located at the end of the threshing cage, does not do any significant propelling of the rotor discharge out the rear thereof, and thus locating fans adjacent the end of the beater does not significantly impact on the discharge of the material other than grain out the rear of the threshing cage." The '660 patent does not disclose using the pair of fans located adjacent to the straw beater to prevent formation of vortices between the straw beater and any subsequent residue treatment device, as no subsequent residue treatment device is shown.

U.S. Pat. No. 713,229 similarly discloses a pair of fans located adjacent to the straw beater, but, again, does not disclose using the pair of fans to prevent formation of vortices between the straw beater and a subsequent residue treatment device. U.S. Pat. No. 925,002 similarly discloses a pair of fans located adjacent to a straw beater, but the pair of fans are used to scatter grain and MOG onto the sieves. European Patent No. 1,187,526 discloses the use of a pair of fans located adjacent to the residue chopper, rather than adjacent to the straw beater. They are used to discharge MOG from the straw and chaff spreader, not to prevent the formation of vortices between the straw beater and the residue chopper. U.S. Pat. No. 6,113,491 and U.S. Published Application No. 20040043804 similarly disclose fans located adjacent to the residue chopper, which are used to help discharge MOG from the chopper and/or spreader.

Published PCT Application No. 2005022980 discloses essentially two embodiments. One involves a chopper located at the end of the rotor and concaves, in lieu of a straw beater, which chopper has fans adjacent to it. These fans direct the flow of MOG through a plenum and over a tailboard for distribution on the field. Alternately, the airflow from the fans is directed in parallel with the plenum through separate ducts before joining the flow of MOG at the tailboard. No subsequent residue treatment device is shown. Therefore, this embodiment does not address the problem of the formation of vortices between the straw beater and any subsequent residue treatment device. Another embodiment involves a "conventional rear mounted straw chopper." In this embodiment, the additional fans are either adjacent to the chopper, or located elsewhere and the flow therefrom ducted to the chopper. This embodiment also does not address the problem of the formation of vortices between the straw beater and any subsequent residue treatment device, because the flow is not directed between the straw beater and subsequent residue treatment device.

What is needed in the art is a residue handling system that avoids the formation of vortices in the flow of airborne MOG between the straw beater and a subsequent residue treatment device under all operating conditions, especially within the flow of airborne MOG containing courser non-grain material.

SUMMARY OF THE INVENTION

The present invention provides a residue handling system that avoids the formation of vortices in the flow of airborne MOG under all operating conditions. At least one wind generating system, which may be at least one axial fan, at least one centrifugal fan, or at least one compressed air source is provided at the end(s) of the straw beater. The at least one wind generating system may be co-axial with the straw beater, or may be located at the extremities of the straw beater without being exactly co-axial. The at least one wind generating system may share the same shaft as the straw beater, or may be independently driven. Alternately, the at least one wind generating system may be indirectly driven by the straw beater, or by the same source of power as the straw beater, such as by way of a gear or belt drive. In this way, the at least one wind generating system may rotate at the same rate, at a greater rate, or at a lesser rate than the straw beater.

The at least one wind generating system propels and directs additional air toward the upper rear portion of the residue handling system, and more particularly towards the intake of a residue chopper or other subsequent residue treatment device. This air from the centrifugal fans may be directed by vanes, nozzles, or other flow directing devices. This air flow is operative to further entrain, render airborne, and transport material other than grain proceeding from the straw beater to the subsequent residue treatment device, without the formation of vortices and its attendant clogging effect. The air drawn into the at least one wind generating system may be drawn from directly adjacent to the straw beater. Alternately, the air drawn into the at least one wind generating system may be drawn by appropriate ducting from another convenient location within the threshing and separating system or the cleaning system, or from another convenient location within the combine, such as from a compartment surrounding the diesel engine, as a non-limiting example. Still alternately, the air drawn into the at least one wind generating system may be drawn from the exterior of the combine.

The invention in one form is directed to a residue handling system of an agricultural harvester. The agricultural harvester has a threshing and separating system and a cleaning system for separating grain from material other than grain, and for further cleaning the grain, respectively. The residue handling system includes a straw beater for receiving material other than grain from the threshing and separating system and for removing any remaining grains therefrom. A subsequent residue treatment device receives the material other than grain from the straw beater and breaks down larger parts of the material other than grain prior to discharge of the material other than grain from the agricultural harvester. At least one wind generating system is located at an end of the straw beater. The at least one wind generating system generates and directs a flow of air from the vicinity of the straw beater to the subsequent residue treatment device. The flow of air is directed by the at least one wind generating system to pass substantially through an upper rearward part of the residue handling system. The flow of air operates to further entrain, render airborne, and transport material other than grain proceeding from the straw beater to the subsequent residue treatment device.

An advantage of the present invention is that formation of vortices in the airborne MOG flow proceeding from the straw beater to the residue chopper or other subsequent residue treatment device is avoided, and the MOG and residue including courser non-grain material moves smoothly through the residue handling system under all operating conditions without clogging.

Another advantage is that, by operation of Bernoulli's principle, the increase in velocity of the air moving from the straw beater to the residue chopper in the area of the upper portion of the residue handling system results in the airborne MOG, residue, and chaff proceeding from the cleaning system being drawn vertically upwards and increasing in volume and flow. This further improves the flow of the airborne MOG, residue, and chaff through the cleaning system and through the residue handling system.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material that is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
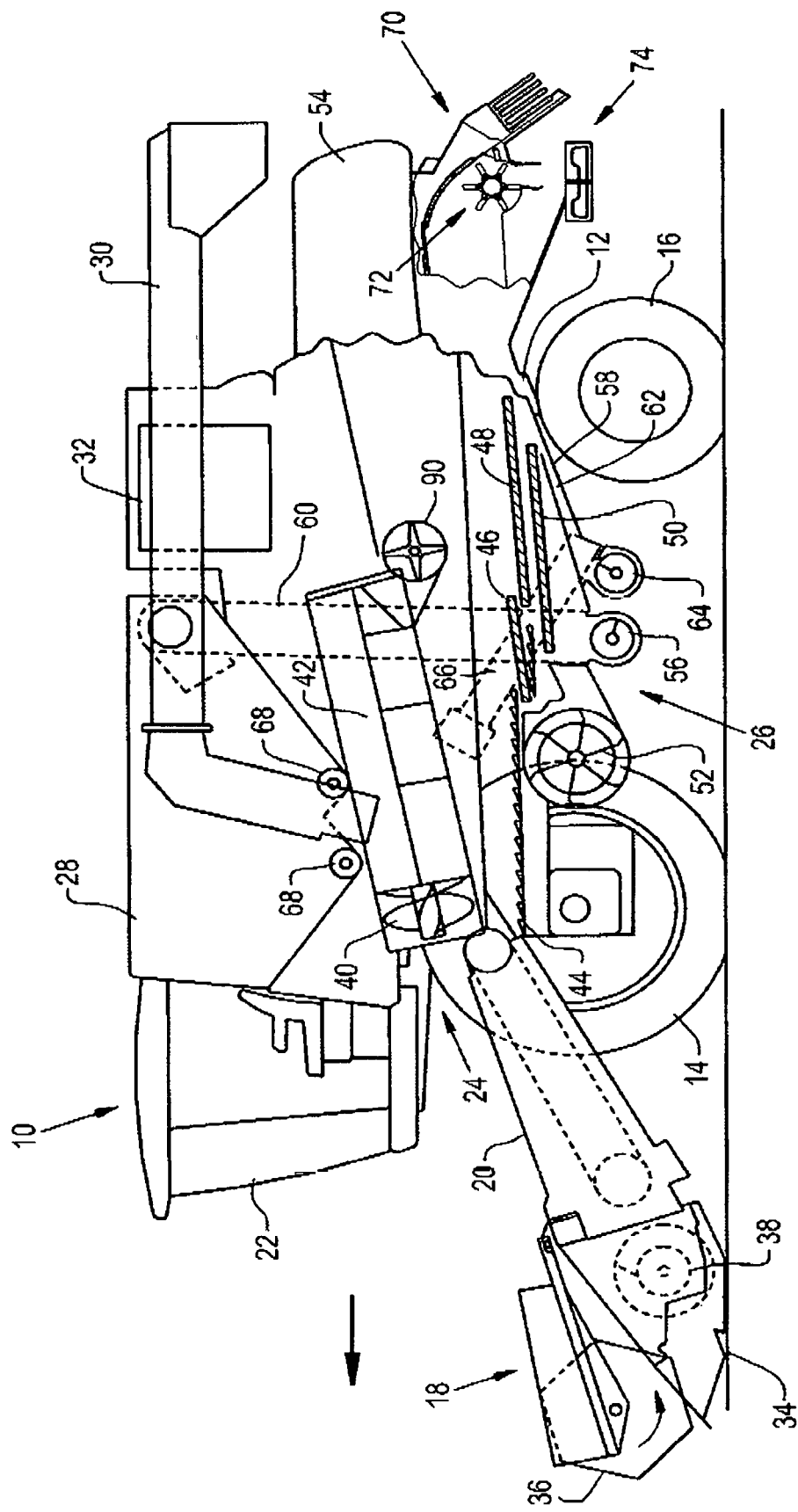
FIG. 1 is a side view of an agricultural harvester in the form of a combine illustrating a residue handling system in a cutout view toward the rear of the harvester.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Unloading conveyor 30 is illustrated as an unloading auger, but can also be configured as a belt conveyor, chain elevator, etc.

The front wheels 14 are larger flotation type wheels, and rear wheels 16 are smaller steerable wheels. Motive force is selectively applied to the front wheels 14 through a power plant in the form of a diesel engine 32 and a transmission (not shown). Although the combine 10 is shown as including wheels, is also to be understood that the combine 10 may include tracks, such as full tracks or half-tracks.

The header 18 is mounted to the front of the combine 10 and includes a cutter bar 34 for severing crops from a field during forward motion of combine 10. A rotatable reel 36 feeds the crop into the header 18, and a double auger 38 feeds the severed crop laterally inwardly from each side toward the feeder housing 20. The feeder housing 20 conveys the cut crop to threshing and the separating system 24, and is selectively vertically movable using appropriate actuators, such as hydraulic cylinders (not shown).

The threshing and separating system 24 is of the axial-flow type, and generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10 after passing through a straw beater 90, which separates any remaining grains from among the MOG. Smaller elements of crop material including grain and non-grain crop material, including particles lighter than grain, such as chaff, dust and straw, are discharged through perforations of the concave 42.

Grain that has been separated by the threshing and separating assembly 24 falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48 and 50 is subjected to a cleaning action by the fan 52, which provides an airflow through the sieves, to remove MOG, residue, chaff, and other impurities such as dust from the grain by making this material airborne for discharge from the straw hood 54 of the combine 10. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of the lower sieve 50. The clean grain auger 56 receives clean grain from each sieve 48, 50 and from bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via tailings auger 64 and the return auger 66 to the upstream end of the cleaning system 26 for repeated cleaning action. The cross augers 68 at the bottom of the grain tank 28 convey the clean grain within the grain tank 28 to the unloading auger 30 for discharge from the combine 10.

A residue handling system 70 integrated in the rear of the harvester 10 receives airborne MOG, residue, and chaff from the threshing and separating system 24 and from the cleaning system 26. The residue handling system 70 includes a residue chopper 72 which serves to break down larger parts of the MOG such as stalks and leaves into smaller pieces. The residue handling system 70 further includes a straw and chaff spreader 74, which serves to selectively spread the crop residue on the field behind the harvester 10.

Figure 2:
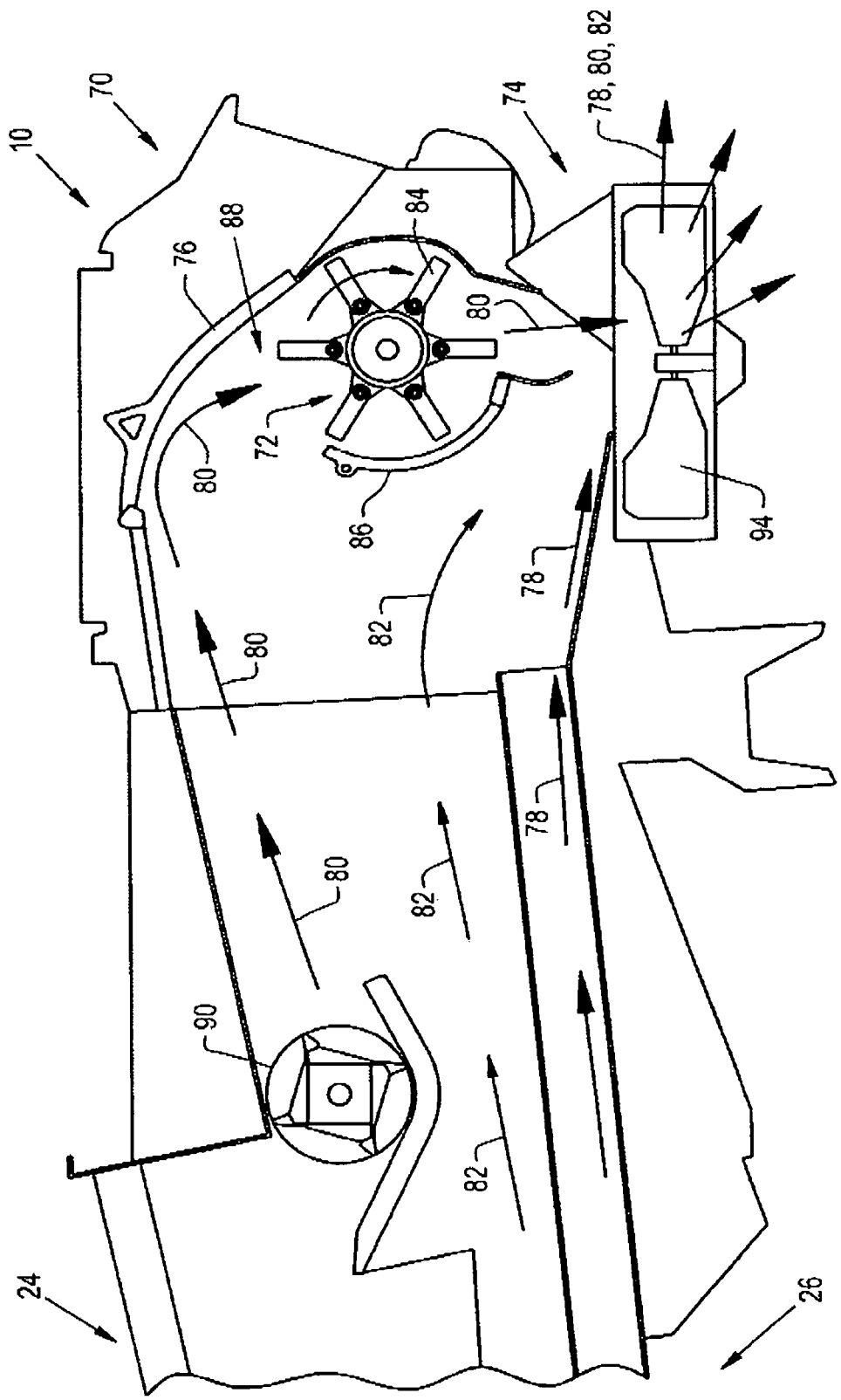
FIG. 2 is a detail view of a residue handling system of a combine.

Turning now to FIG. 2, a detail view of a residue handling system 70 of a combine 10 is shown. Airborne MOG and residue 80 is received by the residue handling system 70 from the threshing and separating system 24 by way of the straw beater 90. Further airborne MOG, residue, and chaff 82 is received by the residue handling system 70 coming from the pre-cleaning sieve 46 and upper sieve 48 (not shown) of the cleaning system 26 (not shown). Additional airborne MOG, residue, and chaff 78 is received by the residue handling system 70 coming from the lower sieve 50 (not shown) of the cleaning system 26 (not shown). Each of these streams of airborne MOG, residue, and chaff 78, 80, and 82 are rendered airborne by airflow provided by the cleaning fan 52 (not shown). The lower streams of MOG, residue, and chaff 78 and 80 may be partially separate as shown or may come from the pre-cleaning sieve 46, upper sieve 48, and lower sieve 50 in a single flow.

At least part of the flow of airborne MOG and residue 80 proceeding from the straw beater 90, specifically the larger stalks and leaves, is directed by the airflow towards the upper rear part of the residue handing system 70, where it may selectively exit the residue handling system 70 through a windrow selection door 76 to be laid on the field in windrows, when such windrow selection door 76 is placed in an open position by an operator of the combine 10. Alternately, this part of the airborne MOG and residue 80 may enter a residue chopper 72 through its intake 88 when the windrow selection door 76 is closed by the operator, where the airborne MOG and residue 80 is chopped into smaller pieces by the chopper blades 84 of the residue chopper 72. Still more alternately, no windrow selection door 76 may be provided, so that all of the airborne MOG and residue 80 proceeding from the straw beater 90 enters the residue chopper 72 through its intake 88 to be chopped to smaller pieces. The residue chopper 72 may be separated over a portion of its circumference from the remainder of the airborne MOG and residue flow 78 and 82 by a front wrapper wall 86. The part of the airborne MOG and residue 80 having passed through the residue chopper 72 is then discharged into the straw and chaff spreader 74 to be spread across the field by impellers 94, along with the smaller fractions of MOG, residue, and chaff 78 and/or 82 coming from the sieves 46, 48, and 50.

The windrow selection door 76, if provided, is positioned generally above the residue chopper 72, and is pivotally movable between the raised windrow mode and the lowered chopping mode. The residue chopper may 72 have various operating speeds, such that a low speed, or complete stoppage of the residue chopper 72, may be used when the windrow selection door 76 is in the windrow mode and a high speed may be used when the windrow selection door 76 is in the chopping mode. Part of the MOG, residue, and chaff flow 82 and/or 78 may go to the residue spreader 74 regardless of the position of the windrow selection door 76.

Figure 3:
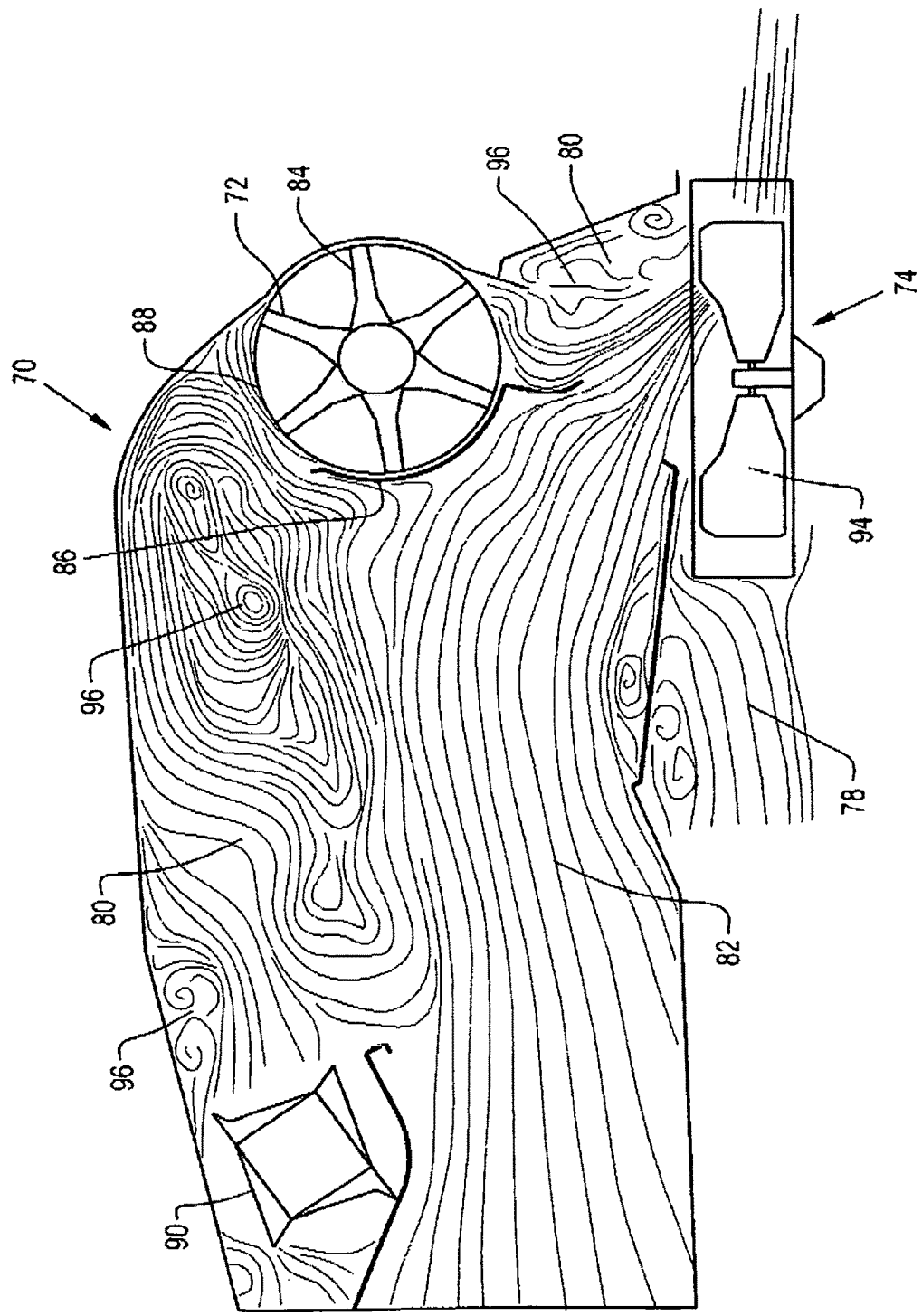
FIG. 3 is a detail view of the residue handling system of FIG. 2 showing movement of air or MOG through the residue handling system represented by flow lines.

Turning now to FIG. 3, a cross sectional view of the residue handling system 70 is shown, including representation of airflow and airborne MOG, residue, and chaff 78, 80, and 82 moving through the residue handling system 70. As in FIG. 2, a stream of airborne MOG and residue 80 enters the residue handling system 70 from the straw beater 90. Another stream of airborne MOG, residue, and chaff 82 enters the residue handling system 70 from the pre-cleaning sieve 46 and upper sieve 48 (not shown). Another stream of airborne MOG, residue, and chaff 78 enters the residue handling system 70 from the lower sieve 50 (not shown). At least part of the flow of airborne MOG and residue 80 proceeding from the straw beater 90, specifically the larger stalks and leaves, is directed by the airflow towards the upper rear part of the residue handing system 70, where it enters the residue chopper 72 through its intake 88 to be chopped into smaller pieces by the chopper blades 84. Thereafter, the flow of airborne MOG and residue 80 is discharged into the straw and chaff spreader 74 to be spread across the field by the impellers 94.

As shown in FIG. 3, a larger volume of airborne MOG and residue 82 proceeds from the pre-cleaning sieve 46 and upper sieve 48 and then proceeds through the straw beater 90. As a result, under certain operating conditions such as occur when the combine 10 is experiencing low throughput, for example when the combine is in the headlands area of a field, vortices 96 may be created within the residue handling system 70 in the upper part between the straw beater 90 and the intake 88 of the residue chopper 72. This prevents the part of the flow of airborne MOG and residue 80 including the larger stalks and leaves from entering the intake 88 of the residue chopper 72 properly, which may result in clogs. Further vortices 96 may also be created between the residue chopper 72 and the impellers 94 of the straw and chaff spreader 74, also resulting in clogs and poor material flow.

Figure 4:
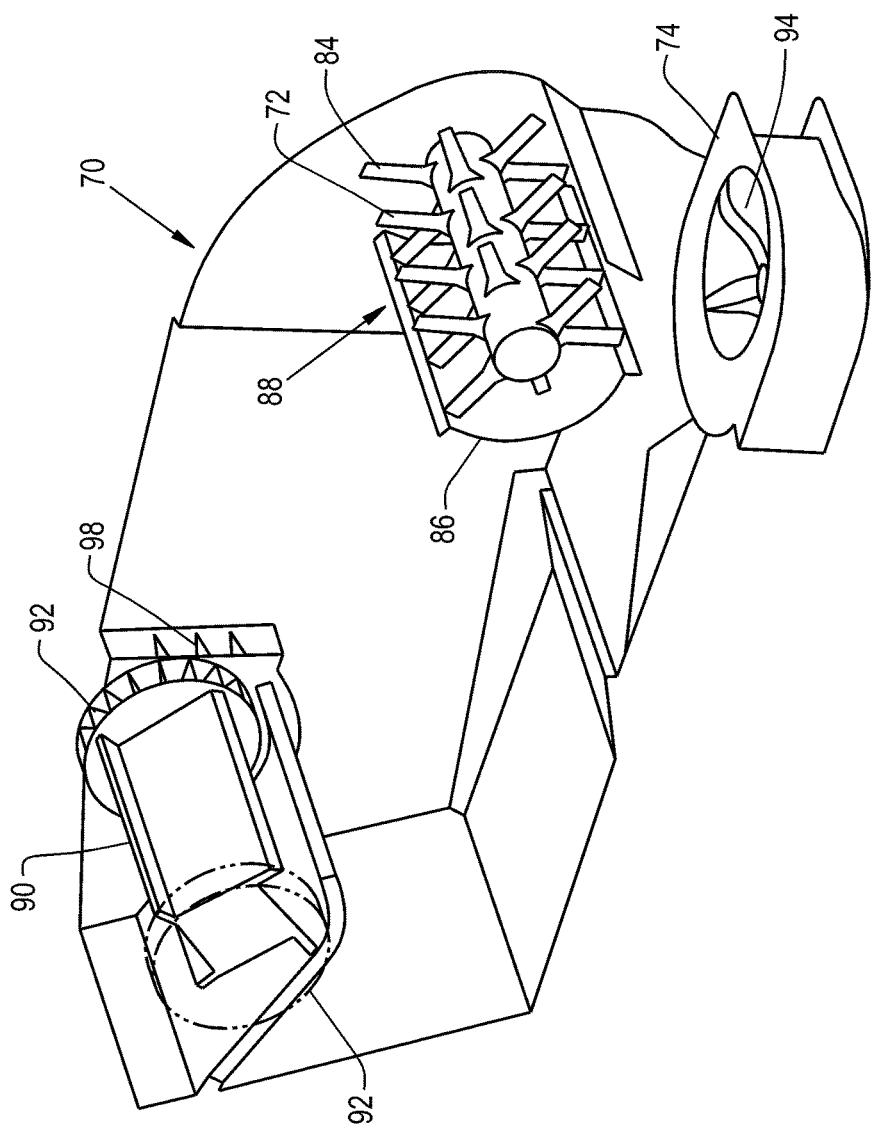
FIG. 4 is an isometric view of a residue handling system according to an embodiment of the present invention.
Figure 5:
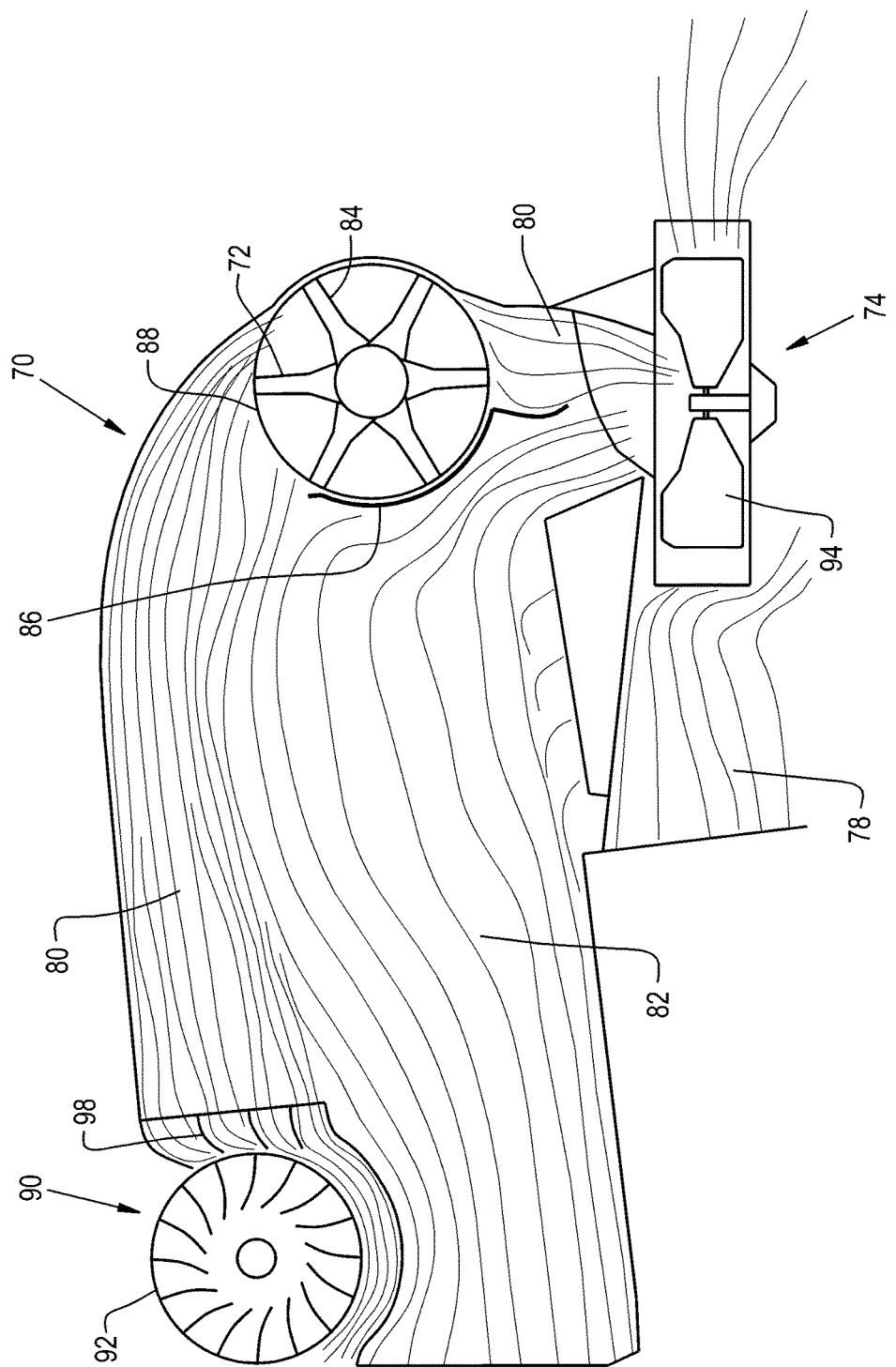
FIG. 5 is a detail view of a residue handling system according to an embodiment of the present invention showing movement of air or MOG through the residue handling system represented by flow lines.

Turning now to FIGS. 4 and 5, an embodiment of a residue handling system 70 according to the present invention is shown, including a straw beater 90 having at either of its extremities a wind generating system, which may be a fan, and which may further be a centrifugal fan 92. Alternately, the wind generating system may be an axial fan or a compressed air source. The centrifugal fan 92 may be co-axial with the straw beater 90, or may be located at the extremities of the straw beater 90 without being exactly co-axial. The centrifugal fan 92 may share the same shaft as the straw beater 90, or may be independently driven. Alternately, the centrifugal fan 92 may be indirectly driven by the straw beater 90, or by the same source of power as the straw beater 90, such as by way of a gear or belt drive. In this way, the centrifugal fan 92 may rotate at the same rate (1:1), at a greater rate (>1:1), or at a lesser rate (<1:1) than the straw beater 90.

Each centrifugal fan 92 receives air moving through and around the straw beater 90 and propels and directs it toward the upper rear portion of the residue handling system 70, and more particularly towards the intake 88 of the residue chopper 72. This air 80 from the centrifugal fans 92 may be directed by vanes 98. Alternately, the air 80 from the centrifugal fans 92 may be directed by nozzles or other flow directing devices. In this way, the development of vortices in the airborne MOG and residue flow 80 proceeding from the straw beater 90 to the chopper blades 84 of the residue chopper 72 is avoided, and the MOG and residue including the larger stalks and leaves moves smoothly through the residue handling system 70 under all operating conditions without clogging. Further, development of vortices in the airborne MOG and residue 80 proceeding from the residue chopper 72 in the area of the lower end of the front wrapper wall 86 is also avoided by virtue of the additional and forceful air being blown into the residue chopper 72 by the centrifugal fans 92 at the ends of the straw beater 90. Additionally, when the windrow selection door 76 is in the open position, the centrifugal fans 92 improve the airborne MOG and residue flow 80 proceeding from the straw beater 90 out of the windrow selection door 76.

In this way, the MOG and residue proceeds smoothly from the residue chopper 72 to the impellers 94 of the straw and chaff spreader 74. Additionally, by operation of Bernoulli's principle, the increase in velocity of the air moving from the straw beater 90 to the intake 88 of the residue chopper 72 in the area of the upper portion of the residue handling system 70 results in the airborne MOG, residue, and chaff 82 and/or 78 proceeding from the pre-cleaning sieve 46, upper sieve 48, and/or lower sieve 50 (not shown) being drawn vertically upwards and increasing in volume and flow. This further improves the flow of the airborne MOG, residue, and chaff 82 and/or 78 through the residue handling system 70.

The air drawn into the centrifugal fans 92 may be drawn from directly adjacent to the straw beater 90. Alternately, the air drawn into the centrifugal fans 92 may be drawn by appropriate ducting from another convenient location within the threshing and separating system 24 or the cleaning system 26. Still alternately, the air drawn into the centrifugal fans 92 may be drawn by appropriate ducting from another convenient location within the combine 10, such as from a compartment surrounding the diesel engine 32, as a non-limiting example wherein drawing air from around the diesel engine 32 aids in removing dust from the engine environment. Still alternately, the air drawn into the centrifugal fans 92 may be drawn by appropriate ducting from the exterior of the combine 10.

What is claimed is:
1. An agricultural harvester comprising:
   a threshing and separating system; and
   a residue handling system comprising:
   a straw beater for receiving material other than grain from the threshing and separating system;
   a residue treatment device receiving the material other than grain from the straw beater, the residue treatment device breaking down larger parts of the material other than grain prior to discharge of the material other than grain from the agricultural harvester; and at least one wind generating system located at an end of the straw beater, the at least one wind generating system configured to generate a flow of air from a vicinity of the straw beater and wherein the flow of air provided by the at least one wind generating system is further directed by at least one of vanes, nozzles, and flow directing devices to pass substantially through an upper rearward part of the residue handling system toward the residue treatment device.

2. The agricultural harvester of claim 1, wherein the flow of air provided by the at least one wind generating system is further directed above and adjoining a flow of air and airborne material other than grain proceeding from a cleaning system.

3. The agricultural harvester of claim 2, wherein the flow of air and airborne material other than grain proceeding from the cleaning system includes at least one of a flow of air and airborne material other than grain proceeding from a pre-cleaning sieve or an upper sieve, and a flow of air and airborne material other than grain proceeding from a lower sieve.

4. The agricultural harvester of claim 1, wherein the at least one wind generating system comprises one of at least one axial fan, at least one centrifugal fan, and at least one compressed air source.

5. The agricultural harvester of claim 1, wherein the at least one wind generating system is coaxial with the straw beater or shares a shaft with the straw beater.

6. The agricultural harvester of claim 1, wherein the at least one wind generating system is one of directly driven by the straw beater at a drive ratio of 1:1, indirectly driven by the straw beater at a drive ratio of 1:1, indirectly driven by the straw beater at a drive ratio of greater than 1:1, indirectly driven by the straw beater at a drive ratio of less than 1:1, and driven by a common source of power with the straw beater.

7. The agricultural harvester of claim 1, wherein the residue treatment device is a residue chopper for discharging chopped material other than grain to at least one spreader.

8. The agricultural harvester of claim 7, wherein the residue chopper comprises an intake located in an upper rearward part of the residue handling system.

9. The agricultural harvester of claim 1, further comprising a windrow selection door located proximate to the residue treatment device, the flow of air from the at least one wind generating system further operating to transport material other than grain proceeding from the straw beater out of the windrow selection door when the windrow selection door is in an open position.

10. The agricultural harvester of claim 1, wherein air drawn into the at least one wind generating system is one of drawn from directly adjacent to the straw beater, drawn from within the threshing and separating system, drawn from within a cleaning system, drawn from within a compartment surrounding a diesel engine of the agricultural harvester, and drawn from an exterior of the agricultural.

* * * * *